(12) United States Patent
Gudivada et al.

(10) Patent No.: US 9,350,852 B1
(45) Date of Patent: May 24, 2016

(54) INTELLIGENT AUTO SCREEN LOCK

(71) Applicant: QUALCOMM Incorporated, San Diego, CA (US)

(72) Inventors: Naga Chandan Babu Gudivada, Hyderabad (IN); Mohan Sree Bhadra Saithej Vaddadi, Hyderabad (IN); Venkata Raji Reddy Kanthala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/619,056

(22) Filed: Feb. 10, 2015

(51) Int. Cl.
*H04M 1/725* (2006.01)

(52) U.S. Cl.
CPC .................. *H04M 1/72563* (2013.01)

(58) Field of Classification Search
CPC .................................................. H04M 1/72563
See application file for complete search history.

(56) References Cited

U.S. PATENT DOCUMENTS

| 7,453,443 | B2  | 11/2008 | Rytivaara et al. | |
|---|---|---|---|---|
| 7,869,789 | B2* | 1/2011 | Hassan | G06F 21/31 455/410 |
| 2011/0256848 | A1 | 10/2011 | Bok, II et al. | |
| 2011/0294467 | A1* | 12/2011 | Kim | G06F 1/1643 455/411 |
| 2012/0229406 | A1* | 9/2012 | Wu | G06F 3/04886 345/173 |
| 2013/0009858 | A1* | 1/2013 | Lacey | G06F 1/1643 345/156 |
| 2013/0082945 | A1* | 4/2013 | Jo | H04M 1/67 345/173 |
| 2013/0111408 | A1 | 5/2013 | Berus | |
| 2013/0150128 | A1* | 6/2013 | Tsunoda | H04M 1/67 455/566 |
| 2013/0207905 | A1* | 8/2013 | Hankins | G06F 3/041 345/173 |
| 2013/0318475 | A1 | 11/2013 | Xie | |
| 2014/0111453 | A1* | 4/2014 | Seo | G06F 3/04883 345/173 |
| 2014/0115489 | A1 | 4/2014 | Park et al. | |
| 2014/0354576 | A1* | 12/2014 | Nelson | G11B 19/022 345/173 |
| 2014/0364054 | A1* | 12/2014 | Kim | G06F 1/1694 455/26.1 |
| 2015/0035767 | A1* | 2/2015 | Chen | G06F 3/0416 345/173 |
| 2015/0065091 | A1* | 3/2015 | Lee | H04W 4/001 455/411 |
| 2015/0160776 | A1* | 6/2015 | Ajichi | G06F 3/0488 345/174 |

OTHER PUBLICATIONS

"Touch Blocker" by Argotronic. Updated Aug. 2014. Retrieved from https://play.google.com/store/apps/details?id=com.argotronic.touchblocker&hl=en.*

* cited by examiner

*Primary Examiner* — Nathan Mitchell
(74) *Attorney, Agent, or Firm* — Arent Fox LLP

(57) ABSTRACT

A method, an apparatus, and a computer program product are provided. The apparatus may be a UE. The UE has a screen display. The UE detects that at least one image is being rendered by a first application in a predetermined display mode at the screen display. The UE receives a first input through an input device. The first input instructs the UE to perform a function. The UE discards the first input and continuing displaying the at least one image based on a predetermined rule.

18 Claims, 7 Drawing Sheets

INTELLIGENT AUTO SCREEN LOCK

BACKGROUND

1. Field

The present disclosure relates generally to a user equipment (UE), and more particularly, to techniques of operating a UE in a locked-screen mode. For example, the present disclosure describes techniques of automatically locking/unlocking a screen display of a UE when a particular application is invoked or stopped.

2. Background

A UE such as a mobile phone, a touch screen computer, or a tablet computer may have a touch panel functioning as an input device. The touch panel remains active even when the UE is running an active application such as a video streaming program, a video chat program, or etc. An unintentional touch on the touch panel may disturb such an active application. Accordingly, there is a need to improve user experience.

SUMMARY

In an aspect of the disclosure, a method, a computer program product, and an apparatus are provided. The apparatus may be a UE. The UE has a screen display. The UE detects that at least one image is being rendered by a first application in a predetermined display mode at the screen display. The UE receives a first input through an input device. The first input instructs the UE to perform a function. The UE discards the first input and continuing displaying the at least one image based on a predetermined rule.

DETAILED DESCRIPTION

Figure 1:
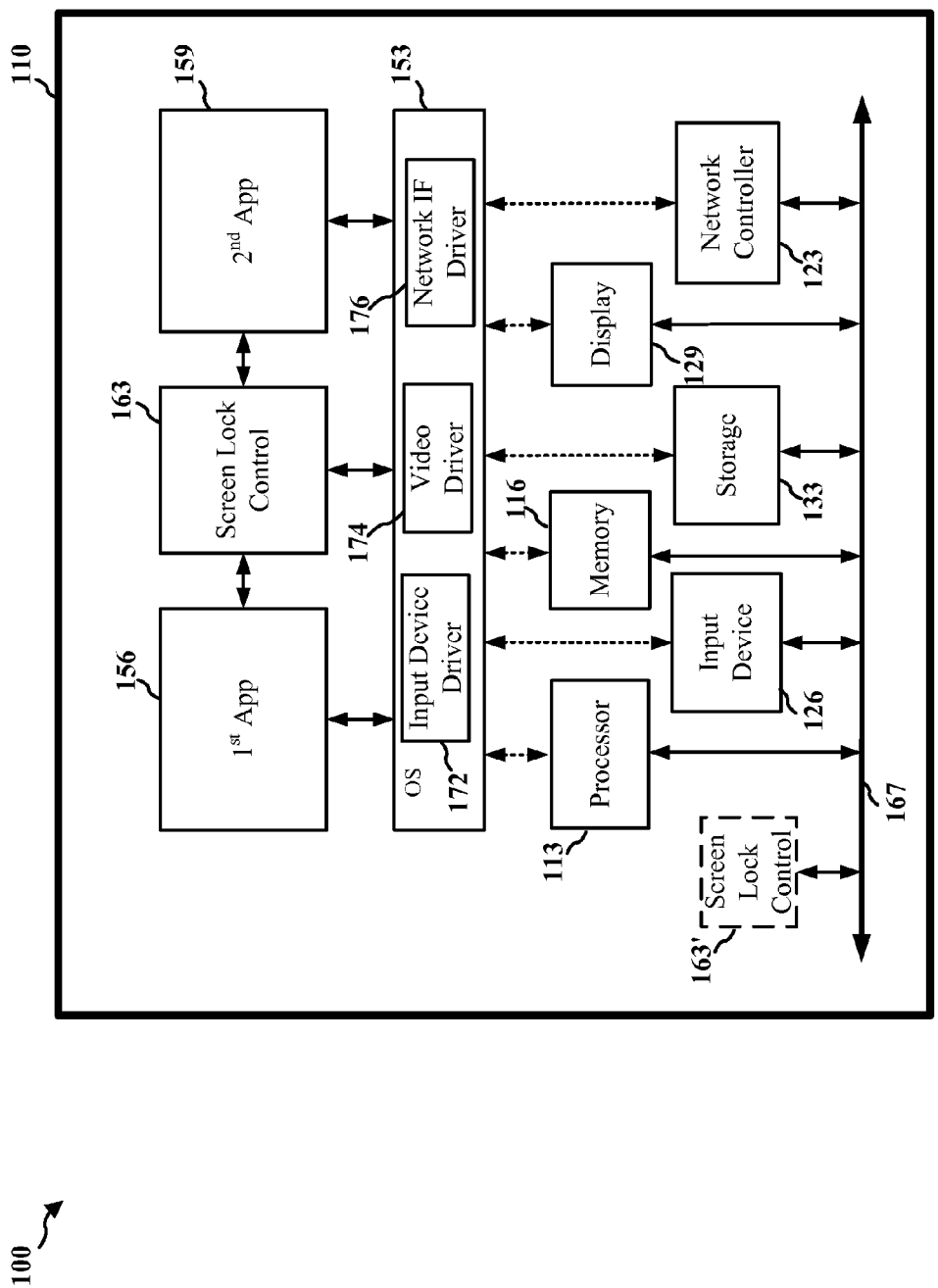
FIG. 1 is a diagram illustrating functional components of a UE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Apparatuses and methods will be described in the following detailed description and may be illustrated in the accompanying drawings by various blocks, modules, components, circuits, steps, processes, algorithms, elements, etc.

Several aspects of a UE will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

A UE may be configured to enter a locked-screen mode after waiting for a specific amount of time (user configurable) from the time an active application such as a video streaming program started. User can manually unlock a locked screen by, for example, hard pressing the power key for a specific duration or long pressing on touch panel to unlock the screen. Further, the locked screen may be automatically unlocked to a normal mode when the active application such as a video streaming program or a video chat program has ended. The locked screen may also be automatically unlocked to a normal mode when the UE receives an incoming voice call or a request from other high priority applications that need immediate user attention.

FIG. 1 is a diagram 100 illustrating functional components of a UE. Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. A UE may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

An exemplary UE 110 has, among other components, a processor 113, a memory 116, an input device 126, a display device 129, a storage 133, and a network controller 123. In certain configurations, the UE 110 may have more than one processor or more than one each of the other components described supra. Examples of the processor 113 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The one or more processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The memory 116 is a volatile data storage device such as a RAM. The memory 116 is a nonvolatile data storage device such as a flash memory or a solid-state memory device. The storage 133 may be a distributed memory device with separate data stores coupled to the processor 113. The input device 126 may be a keyboard, a mouse, a touch screen (touch panel), etc. The components of the UE 110 may communicate through a system bus 167. An operating system (OS) 153 (or other system management software) manages and allocates the resources of the components of the UE 110. Particularly, the OS 153 has an input device driver 172 that manages the input device 126, a video driver 174 that manages graphic display, and a network interface driver 176 that manages the network controller 123.

One or more applications may run on the OS 153. As an illustrative example and for clarity, FIG. 1 shows a first application 156 and a second application 159 running on the OS 153. For example, the first application 156 may be a video streaming program. The second application 159 may be a web browser program. The UE 110 also has a screen lock control module 163 in communication with the first application 156, the second application 159, and components of the OS 153 (particularly the input device driver 172, the video driver 174, and the network interface driver 176).

In one configuration, the screen lock control module 163 may be a module that runs on top or within the OS 153, utilizing the processor 113 and the memory 116. Thus, the screen lock control module 163 may communicate with the first application 156, the second application 159, the input device driver 172, the video driver 174, and the network interface driver 176 through interfaces provided by the OS 153. As will be described infra, the screen lock control module 163 may reside in the memory 116. The processor 113 may read processing instructions and code of the screen lock control module 163 from the memory 116. Accordingly, the processor 113 may be configured to detect that at least one image is being rendered in a predetermined display mode at the screen display. The processor 113 may be configured to receive a first input through an input device. The first input instructs the UE 110 to perform a function. The processor 113 may be configured to discard the first input and continue displaying the at least one image based on a predetermined rule.

In another configuration, the screen lock control module 163 may be implemented as a screen lock control module 163' that is a controller with its own processing unit and memory unit and that may communicate with the first application 156, the second application 159, the OS 153 through the system bus 167. As will be described infra, the screen lock control module 163' may utilize its own processing and memory units to detect that at least one image is being rendered in a predetermined display mode at the screen display. The screen lock control module 163' may utilize its own processing and memory units to receive a first input through an input device. The first input instructs the UE 110 to perform a function. The screen lock control module 163' may utilize its own processing and memory units to discard the first input and continue displaying the at least one image based on a predetermined rule.

The UE 110 may be implemented with a bus architecture, represented generally by the system bus 167. The system bus 167 may include any number of interconnecting buses and bridges depending on the specific application of the UE 110 and the overall design constraints. The system bus 167 links together various circuits including one or more processors and/or hardware modules, represented by the processor 113, the modules 123, 126, 129, 133, 153, 156, 159, 163, 172, 174, 176 and the computer-readable medium/memory 116. The system bus 167 may also link various other circuits such as timing sources, peripherals, voltage regulators, and power management circuits, which are well known in the art, and therefore, will not be described any further.

The processor 113 is coupled to the computer-readable medium/memory 116. The processor 113 is responsible for general processing, including the execution of software stored on the computer-readable medium/memory 116. The software, when executed by the processor 113, causes the UE 110 to perform the various functions described infra for any particular apparatus. The computer-readable medium/memory 116 may also be used for storing data that is manipulated by the processor 113 when executing software. The UE 110 further includes at least one of the modules 123, 126, 129, 133, 153, 156, 159, 163, 172, 174, and 176. The modules may be software modules running in the processor 113, resident/stored in the computer readable medium/memory 116, one or more hardware modules coupled to the processor 113, or some combination thereof.

Figure 2:
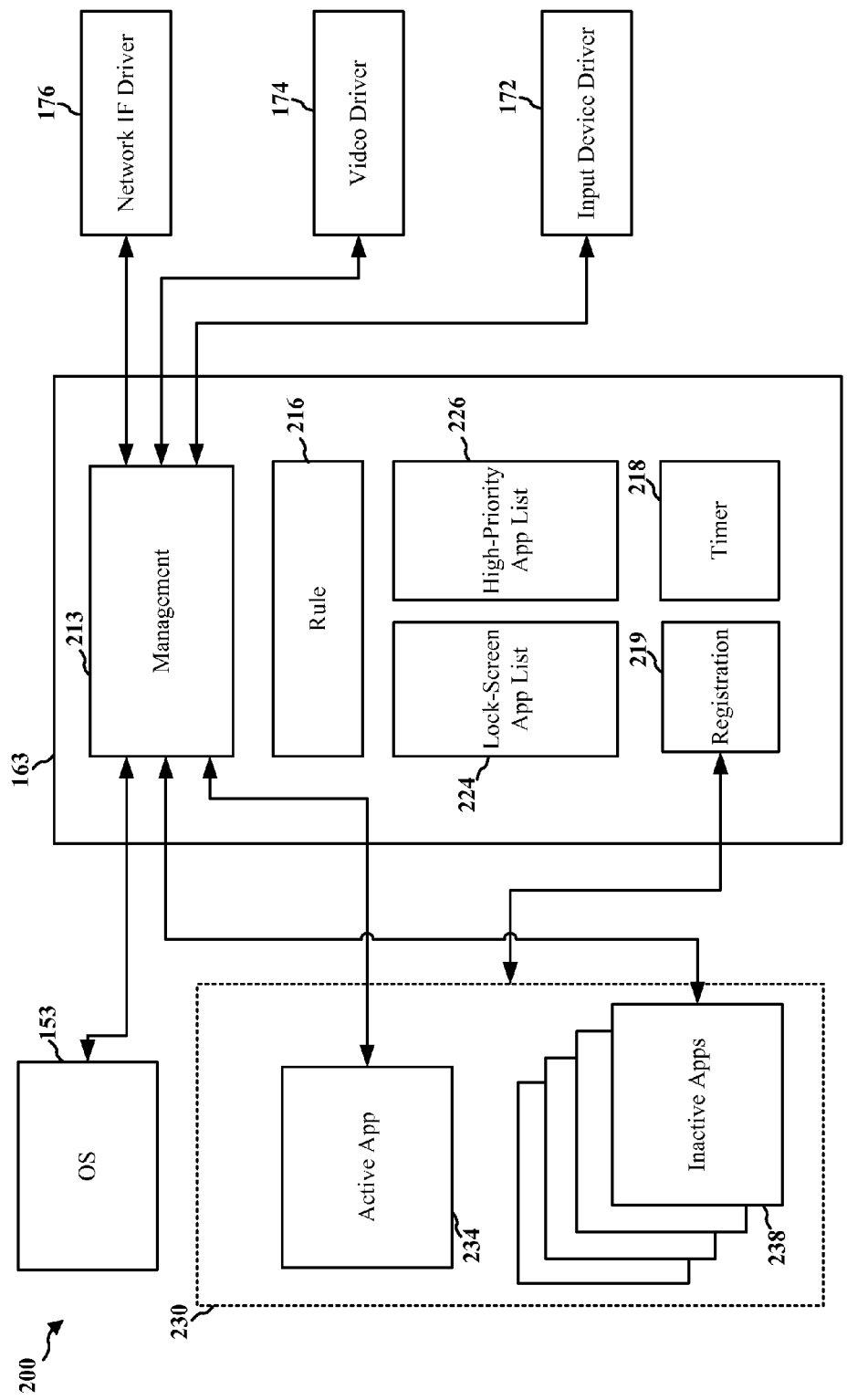
FIG. 2 is a diagram illustrating functional components of a screen lock control module.

FIG. 2 is a diagram 200 illustrating functional components of the screen lock control module 163. The screen lock control module 163 has a management component 213, a rule component 216, a registration component 219, a lock-screen application list 224, and a high-priority application list 226. As will be described supra, the lock-screen application list 224 maintains a list of applications for which the screen lock control module 163 may enter a locked-screen mode. The high-priority application list 226 maintains a list of applications for which the screen lock control module 163 may interrupt a locked-screen mode.

The registration component 219 may receive registration requests from multiple applications 230 running on the OS 153. An application may request to be added on the lock-screen application list 224 or the high-priority application list 226. Further, the registration component 219 may inquire about certain characteristics, e.g., as defined in the rule component 216, of an application and determine whether that application should be added on the lock-screen application list 224 or the high-priority application list 226 based on those characteristics. For example, the rule component 216 may define that an application having functions of displaying pictures, photos, presentation slides, videos, or other multimedia formats should be included in the lock-screen application list 224. The rule component 216 may define that an application having direct communications functions of such as conducting voice calls or video calls should be included in the high-priority application list 226.

The OS 153 may designate one of the multiple applications 230 as an active application 234. The rest of the multiple applications 230 are inactive applications 238. The active application 234 receives input events generated by input device driver 172. The user interface of the active application 234 may be displayed on top of the user interfaces of the inactive applications 238. An inactive application 238 may request the OS 153 to switch the status of that inactive application 238 from inactive to active. Further, the OS 153 may switch the status of an inactive application 238 from inactive to active based on an input from a user or the operation of the inactive application 238. In this configuration, as will be described supra, in certain circumstances, the switching request also needs to be allowed by the screen lock control module 163. Particularly, the OS 153 or the requesting inactive application 238 may send the switching request to the management component 213. The management component 213 may determine whether to approve the switch request based on whether the requesting inactive application 238 is on the high-priority application list 226. Once receiving an approval from the screen lock control module 163, the OS 153 may switch the status of the active application 234 (e.g., the first application 156) from active to inactive and switch the status of the requesting inactive application 238 (e.g., the second application 159) from inactive to active. Accordingly, the previous requesting inactive application 238 (e.g., the second application 159) becomes the current active application 234. The previous active application 234 (e.g., the first application 156) becomes an inactive application 238.

The management component 213 may communicate with the active application 234, the network interface driver 176, the video driver 174, and the OS 153 and may determine a display mode of the active application 234 based on information obtained from those components. For example, based on the activities of the network interface driver 176 and the display functions of the active application 234, the management component 213 can determine whether the video streaming program is in a video streaming mode. As another example, based on information obtained from the active application 234 and/or the video driver 174, the management component 213 may determine whether a presentation program is in a full screen presentation mode. As will be described supra, based on the display mode of the active application 234 and predetermined rules defined in the rule component 216, the management component 213 can determine whether to "lock" the screen.

The screen lock control module 163 has a timer 218, which may be utilized by the management component 213 to determine whether an operation has lasted a predetermined time period. Further, the management component 213 configures the OS 153 and/or the input device driver 172 to transmit all the input events generated by the OS 153 and/or input device driver 172 to the management component 213. The management component 213 then determines whether to transfer the received input events to the targeted application such as the active application 234 based on the lock-screen application list 224, the high-priority application list 226, the display mode of the active application 234, and/or a predetermined rule of the rule component 216. When the screen lock control module 163 does not transfer the input events generated in response to the user input to the active application 234, the active application 234 does not respond to the user input as the active application 234 is supposed to. Particularly, the display of the active application 234 may not be changed in response to the user inputs. Therefore, the user may perceive that the screen of the UE 110 is "locked."

Figure 3:
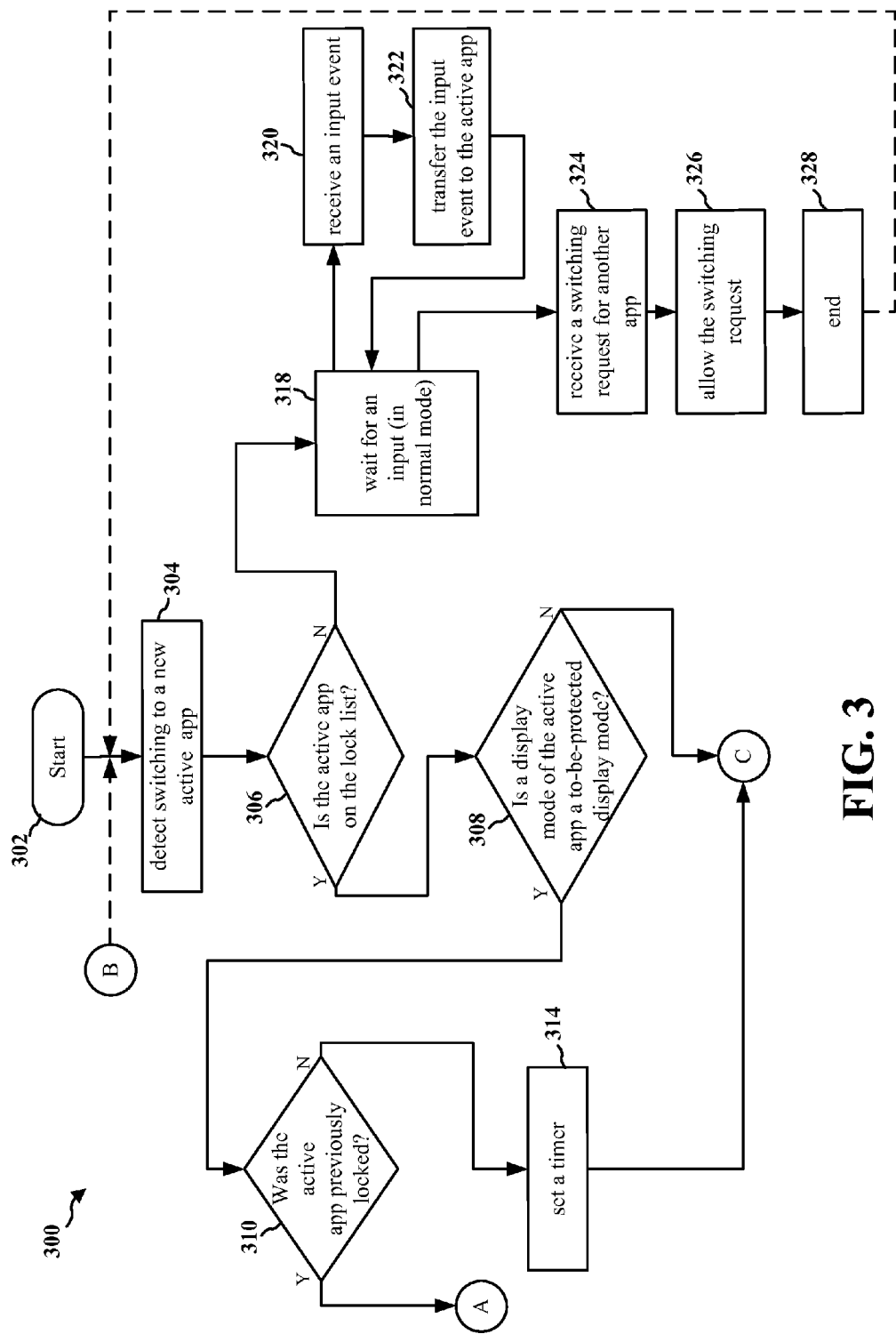
FIG. 3 is a flow chat illustrating a procedure of a screen lock control module.

FIG. 3 is a flow chat 300 illustrating a procedure of the screen lock control module 163. At operation 302, the procedure of the screen lock control module 163 starts. At operation 304, the screen lock control module 163 (e.g., the management component 213) is in communication with the OS 153 and detects that the OS 153 has switched to a new active application 234. For example, the screen lock control module 163 may receive an event from the OS 153 indicating that the status of the first application 156 (i.e., a video streaming program) has been switched to active. In other words, a user may have just started to use the UE 110 to stream a movie. At operation 306, the screen lock control module 163 communicates with the OS 153 and/or the active application 234, and determines the identity of the active application 234. Then, the screen lock control module 163 determines whether the active application 234 is on the lock-screen application list 224.

If the active application 234 is on the lock-screen application list 224, the screen lock control module 163, at operation 308, determines a display mode of the active application 234. Then, the screen lock control module 163 determines whether the display mode is a to-be-protected display mode defined by a rule of the rule component 216. For example, the active application 234 may be a video streaming application and may be playing a video received from a network (e.g., Internet) using a streaming mechanism. The rule configured at the rule component 216 may define such a streaming display mode, where the video buffer of the UE 110 has started buffering video content, as a to-be-protected display mode. As another example, the active application 234 may be a presentation program and may have started presenting slides in a full screen presentation mode. The rule configured at the rule component 216 may define such a full screen presentation mode as a to-be-protected display mode.

Upon determining that the active application 234 is in a to-be-protected display mode, the screen lock control module 163 determines, at operation 310, whether the screen lock control module 163 entered the locked-screen mode previously for the active application 234 according to a locked-application record of the screen lock control module 163 (this operation will be described in detail supra). If the screen lock control module 163 entered the locked-screen mode previously for the active application 234, the procedure enters operation 412 illustrated in FIG. 4. If the screen lock control module 163 did not enter the locked-screen mode previously for the active application 234, the screen lock control module 163, at operation 314, sets the timer 218 to a predetermined value (e.g., 1, 2, 5, or 10 seconds) and starts the timer 218. This value specifies a time period that the screen lock control module 163 should wait before entering the locked-screen mode. Subsequently, the procedure enters operation 516 illustrated in FIG. 5. In other words, if the screen lock control module 163 previously entered the locked-screen mode for the active application 234, then the screen lock control module 163 may enter the locked-screen mode again directly without waiting a predetermined time period (wait period). For example, if an interruption to a video streaming program by an active voice call or a high priority application has ended, the video streaming program may resume operation in the locked-screen mode directly without waiting for the predetermined time period. Further, the predetermined value of the wait period is configurable by another program or a user. For example, the screen lock control module 163 may provide a user interface through which a user may input a predetermined value of the wait period (e.g., 5 seconds). The screen lock control module 163 may provide an application programming interface through which another application may call a configuration function to input a predetermined value of the wait period.

Figure 5:
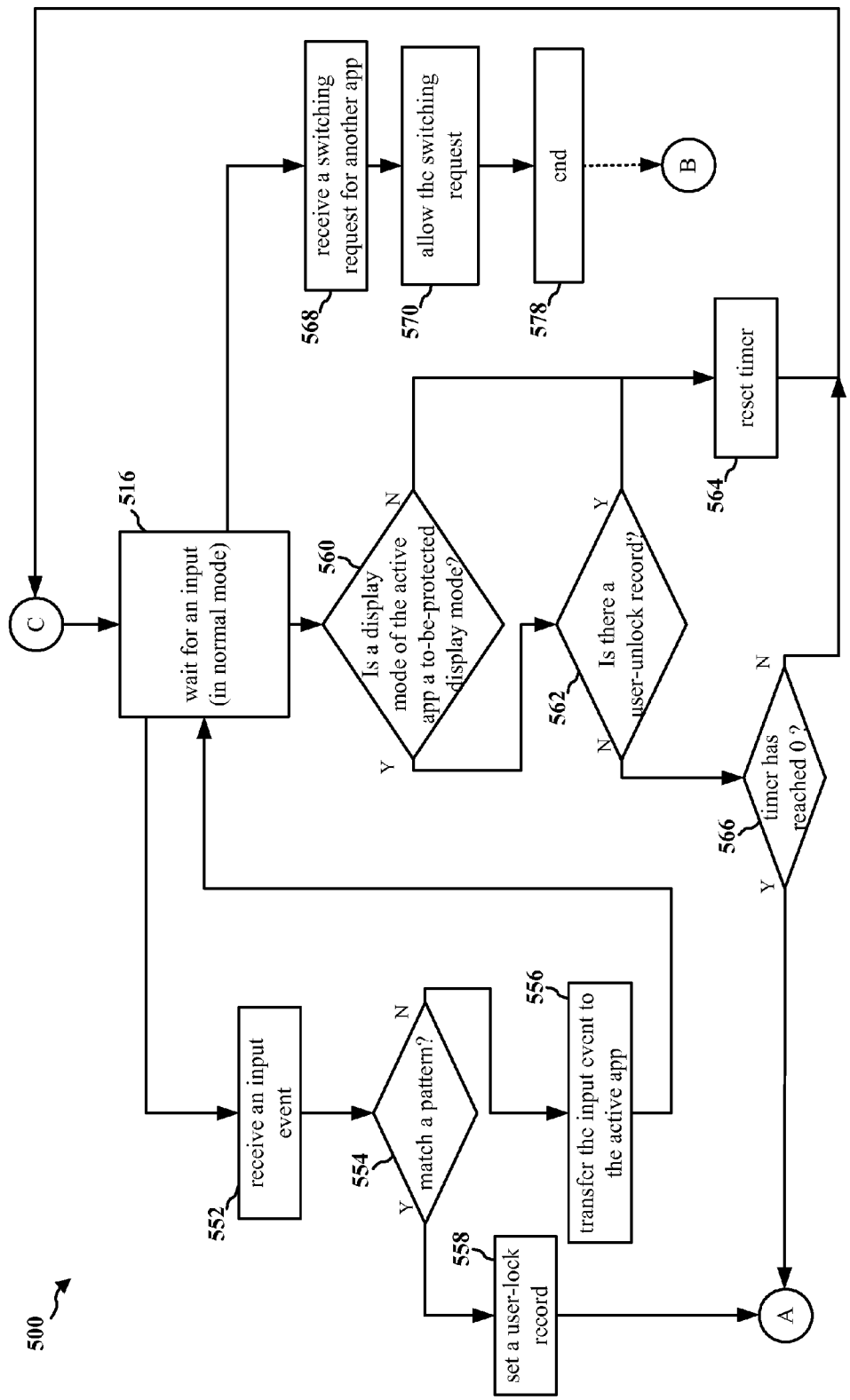
FIG. 5 is a flow chat illustrating a procedure of a screen lock control module operating in a normal mode.

Upon determining, at operation 308, that the active application 234 is not in a to-be-protected display mode, the procedure enters operation 516 illustrated in FIG. 5.

If the screen lock control module 163 determines, at operation 306, that the active application 234 is not on the lock-screen application list 224, then, at operation 318, the screen lock control module 163 operates in a normal mode and waits to receive input events sent by the input device driver 172. For example, the active application 234 may be the second application 159 (i.e., the web browser program). At operation 320, the screen lock control module 163 may receive an input event directed to a targeted application (i.e., the active application 234). In the normal mode, at operation 322, the screen lock control module 163 may simply transfer (forward) the input event to the targeted application (e.g., the web browser program). For example, the input event may be a click event directed to the web browser program. The screen lock control module 163 transfers the input event to the web browser program, which may in response displays a new webpage at the web address selected by the click event.

Within operation 318, at operation 324, the screen lock control module 163 may receive a switching request to assign another application as the active application 234. For example, the UE 110 may receive a voice call. Thus, the OS 153 may request to assign a voice call program as the active application 234 and to display a user interface of the voice call program such that a user of the UE 110 may answer the voice call. In the normal mode, at operation 326, the screen lock control module 163 may always approve the switching request. At operation 328, the current procedure ends and a new procedure starts at operation 304 when the screen lock control module 163 detects that the OS 153 has switched to a new active application 234.

Figure 4:
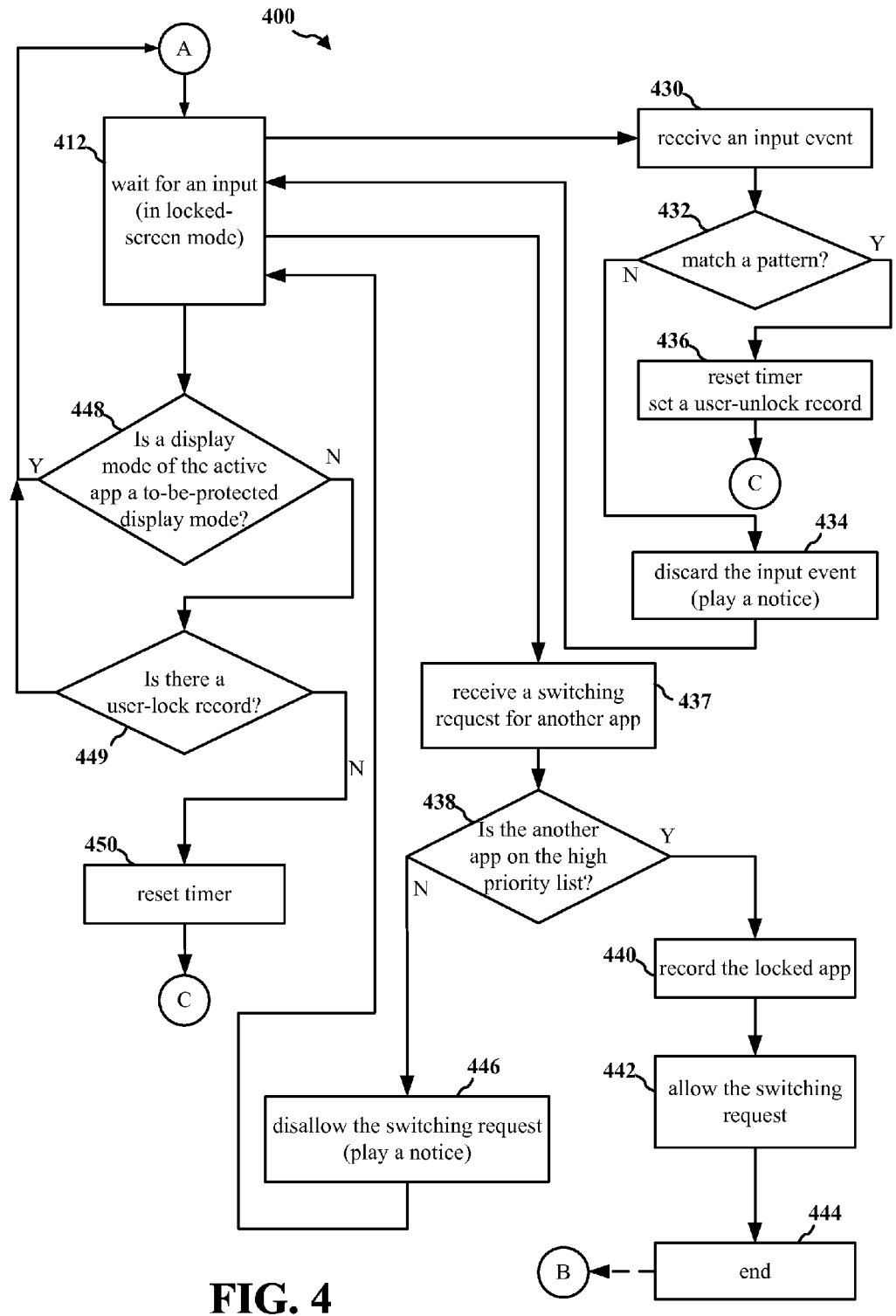
FIG. 4 is a flow chat illustrating a procedure of a screen lock control module operating in a locked-screen mode.

FIG. 4 is a flow chat 400 illustrating a procedure of the screen lock control module 163 operating in a locked-screen mode. At operation 412, the screen lock control module 163 enters into a locked-screen mode and waits for a predetermined time period (e.g., 0.5 second), during which the screen lock control module 163 may receive input events sent by the input device driver 172. Within operation 412, the screen lock control module 163, at operation 430, receives an input event from the input device driver 172. At operation 432, the screen lock control module 163 determines whether the input event represents an input matching a pattern defined at the rule component 216. The screen lock control module 163 is operating in the locked-screen mode. In certain circumstances, a user of the UE 110 may want the screen lock control module 163 to exit the locked-screen mode. The rule component 216 may define a predetermined input pattern, by applying which the user may instruct the screen lock control module 163 to exit the locked-screen mode. For example, the predetermined input pattern may be a long press on the touch screen or a long press on a specific button of the UE 110.

Upon determining that the input event received does not represent an input matching the pattern, the screen lock control module 163, at operation 434, may discard the input events. In other words, the active application 234 (e.g., the video streaming program) may be displaying images while the screen lock control module 163 operates in the locked-screen mode. The screen lock control module 163 does not transfer the inputs received from the input device 126 to the active application 234. A user may perceive that the screen of the UE 110 is locked because inputs at the input device 126 do not affect the display at the display device 129. Optionally, at operation 434, the screen lock control module 163 may generate another input event or message specifying the input received from the input device 126 and send the input event or message to the active application 234. In response to the generated input event or message, the active application 234 may play a notice such as an icon on the screen or a sound. Alternatively, the screen lock control module 163 may directly instruct the UE 110 (e.g., through the OS 153) to play an icon or a sound. As such, the UE 110 alters the user of the UE 110 that an input is received. The user may choose to interrupt the locked-screen mode by enter an input matching the pattern (e.g., long press on the touch screen or a specific button) defined in the rule component 216. Subsequently, the screen lock control module 163 returns to operation 412 and continues waiting for other input events.

Upon determining that the input event received does represent an input matching the pattern, the screen lock control module 163, at operation 436, determines that the user wants to exit the locked-screen mode. Accordingly, the screen lock control module 163 may reset the timer 218 to the predetermined value. Further, the screen lock control module 163 may set a user-unlock record indicating that the user wants the screen lock control module 163 to operate in the normal mode even the display mode of the current active application 234 is a to-be-protected display mode. Subsequently, the procedure enters operation 516 illustrated in FIG. 5.

Within operation 412, at operation 437, the screen lock control module 163 may receive a switching request to assign another application as the active application 234. For example, the UE 110 may receive a voice call. Thus, the OS 153 may request to assign a voice call program as the active application 234 and to display a user interface of the voice call program such that a user of the UE 110 may answer the voice call. In the locked-screen mode, at operation 326, the screen lock control module 163 may only approve the switching request for assigning an application on the high-priority application list 226 as the new active application 234. At operation 438, the screen lock control module 163 determines whether the another application is on the high-priority application list 226. For example, the registration component 219 and/or the rule component 216 may have added the voice call program to the high-priority application list 226. In contrast, a messenger/chat program may not be added on the high-priority application list 226.

Upon determine that the another application (e.g., the voice call program) is on the high-priority application list 226, at operation 440, the screen lock control module 163 keeps a locked-application record indicating that the screen lock control module 163 has entered the locked-screen mode for the current active application 234 (e.g., the video streaming program). Accordingly, in this example, when the UE 110 receives a voice call, the screen lock control module 163 allows the voice call program to be assigned as the new active application 234 and the video streaming program to be assigned as an inactive application 238. Therefore, a user of the UE 110 may use the input device 126 to answer the voice call. (Once the voice call is finished, the OS 153 switches the video streaming program back to the active application 234. Further, based on the locked-application record, at operation 310 the screen lock control module 163 can determine that the screen lock control module 163 has entered the locked-screen mode for the first application 156. Thus, upon switching back to the video streaming program as the active application 234, the screen lock control module 163 may choose to enter the locked-screen mode for the video streaming program immediately without waiting for a predetermined time period defined by the rule component 216 and/or timer 218.) At operation 442, the screen lock control module 163 allows assigning the another application as the new active application 234. Subsequently, at operation 444, the current procedure ends and a new procedure starts at operation 304 when the screen lock control module 163 detects that the OS 153 has switched to a new active application 234.

Upon determining that the switching request is not for an application on the high-priority application list 226, the screen lock control module 163, at operation 446, may disallow the switching request. For example, the UE 110 may receive a messenger message and the OS 153 may request the screen lock control module 163 to allow the messenger program to be assigned as the active application 234 such that the user of the UE 110 may use the input device 126 to reply the message through the messenger program. In this example, because the messenger program is not on the high-priority application list 226, the screen lock control module 163 discards the switching request for the messenger program. Optionally, the screen lock control module 163 may generate another input event or message specifying the switching request received from the input device 126 and send the input event or message to the active application 234. In response to the generated input event or message, the active application 234 may play a notice such as an icon on the screen or a sound. Alternatively, the screen lock control module 163 may directly instruct the UE 110 (e.g., through the OS 153) to play an icon or a sound. As such, the UE 110 alerts a user that a switching request is received. The user may choose to interrupt the locked-screen mode by enter an input matching the pattern (e.g., long press on the touch screen or a specific button) defined in the rule component 216. Subsequently, the screen lock control module 163 returns to operation 412 and continues waiting for other input events.

Further, after the screen lock control module 163 has waited to receive input events for a predetermined time period (e.g., 0.5 second), the procedure enters operation 448. At operation 448, the screen lock control module 163 determines a display mode of the active application 234. Then, the screen lock control module 163 determines whether the display mode is a to-be-protected display mode defined by a rule of the rule component 216. Particularly, the screen lock control module 163 may determine whether the active application 234 has finished displaying a content program and thus has exited the to-be-protected display mode. In one example, the active application 234 may be a video streaming program, and the screen lock control module 163 determines whether the video streaming program has finished streaming a program such as a movie. In another example, the active application 234 may be a presentation program, and the screen lock control module 163 may determine whether a slide presentation ended or whether the presentation program has exited a full screen presentation mode.

Upon determining that the active application 234 is in a to-be-protected display mode, the procedure returns to operation 412, at which the screen lock control module 163 waits for another predetermined time period (e.g., 0.5 second) to receive input events. Upon determining that the active application 234 is not in a to-be-protected display mode, the screen lock control module 163 may, at operation 449, determines whether there is a user-lock record indicating that the user wants the screen lock control module 163 to operate in a locked-screen mode, although the display mode of the current active application 234 is not a to-be-protected display mode. Upon determining that there is such a user-lock record, the procedure returns to operation 412, at which the screen lock control module 163 waits for another predetermined time period (e.g., 0.5 second) to receive input events. Upon determining that there is no such a user-lock record, the screen lock control module 163 may, at operation 450, reset the timer 218 to the predetermined value. Subsequently, the procedure enters operation 516 illustrated in FIG. 5.

FIG. 5 is a flow chat 500 illustrating a procedure of the screen lock control module 163 operating in a normal mode. At operation 516, the screen lock control module 163 has determined that the active application 234 is an application on the lock-screen application list 224. The screen lock control module 163 operates in a normal mode and waits for a predetermined time period (e.g., 0.5 second) to receive input events sent by the input device driver 172.

Within operation 516, the screen lock control module 163, at operation 552, receives an input event from the input device driver 172. In certain circumstances, a user of the UE 110 may want the screen lock control module 163 to enter the locked-screen mode. The rule component 216 may define a predetermined input pattern, by applying which the user may instruct the controller to exit the locked-screen mode. At operation 554, the screen lock control module 163 determines whether the input event represents an input matching a pattern defined at the rule component 216. For example, the predetermined input pattern may be a long press on the touch screen or a long press on a specific button of the device.

Upon determining that the input event received does not represent an input matching the pattern, the screen lock control module 163, at operation 556, may simply transfer (forward) the input event to the active application 234 (i.e., the targeted application). For example, the input event may be a click event on a play button directed to the video streaming program. The screen lock control module 163 transfers the input event to the video streaming program, which may in response play a video streaming program.

Upon determining that the input event received does represent an input matching the pattern, the screen lock control module 163, at operation 558, may set a user-lock record indicating that the user wants the screen lock control module 163 to operate in a locked-screen mode, although the display mode of the current active application 234 is not a to-be-protected display mode. Subsequently, the procedure enters operation 412 illustrated in FIG. 4.

Further, after the screen lock control module 163 has waited to receive input events for a predetermined time period (e.g., 0.5 second), the procedure enters operation 560. At operation 560, the screen lock control module 163 determines a display mode of the active application 234. Then, the screen lock control module 163 determines whether the display mode is a to-be-protected display mode defined by a rule of the rule component 216. For example, the active application 234, which is on the lock-screen application list 224, may be a video streaming program and the screen lock control module 163 may determine whether the video streaming program has entered into a streaming display mode. As another example, the active application 234 may be a presentation program and the screen lock control module 163 may determine whether the presentation program has entered into a full screen presentation mode.

Upon determining that the active application 234 is in a to-be-protected display mode, the screen lock control module 163 determines, at operation 562, whether there is a user-unlock record indicating that the user wants the screen lock control module 163 to operate in a normal mode, although the display mode of the current active application 234 is a to-be-protected display mode.

Upon determining that there is such a user-unlock record, at operation 564, the screen lock control module 163 may reset the timer 218 to the predetermined value (e.g., 5 seconds). Subsequently, the procedure returns to operation 516, at which the screen lock control module 163 waits for another predetermined time period (e.g., 0.5 second) to receive input events.

Upon determining that there is no such a user-unlock record, at operation 566, the screen lock control module 163 determines whether the timer has reached 0. In other words, the screen lock control module 163 determines whether the predetermined time period has passed before the screen lock control module 163 enters the locked-screen mode. Upon determining that the timer has reached 0, the procedure enters operation 412 illustrated in FIG. 4. Upon determining that the timer has not reached 0, the procedure returns to operation 516, at which the screen lock control module 163 waits for another predetermined time period (e.g., 0.5 second) to receive input events.

Further, within operation 516, at operation 568, the screen lock control module 163 may receive a switching request to assign another application as the active application 234. For example, the UE 110 may receive a voice call. Thus, the OS 153 may request to assign a voice call program as the active application 234 and to display a user interface of the voice call program such that a user of the UE 110 may answer the voice call. In the normal mode, at operation 570, the screen lock control module 163 approves the switching request. At operation 578, the current procedure ends and a new procedure starts at operation 304 when the screen lock control module 163 detects that the OS 153 has switched to a new active application 234 (e.g., the voice call program).

Figure 6:
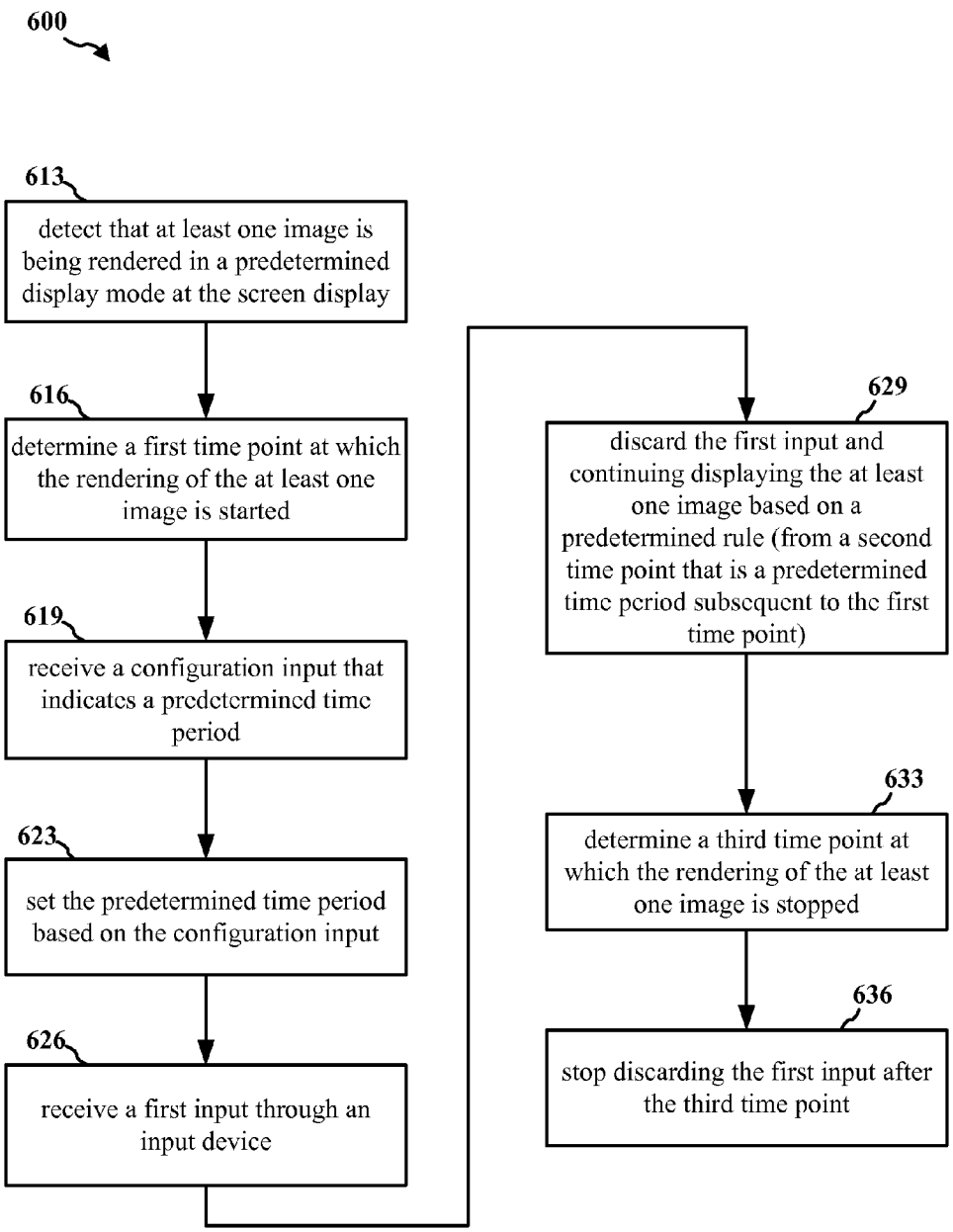
FIG. 6 is a flow chat illustrating a procedure of operating a UE in a locked-screen mode.

FIG. 6 is a flow chat 600 illustrating a procedure of operating a UE (e.g., the UE 110 in FIG. 1) in a locked-screen mode. At operation 613, the UE detects that at least one image is being rendered by a first application in a predetermined display mode at the screen display (e.g., operation 308 in FIG. 3). At operation 616, the UE may determine a first time point at which the rendering of the at least one image is started (e.g., operation 314 in FIG. 3). At operation 619, the UE may receive a configuration input that indicates a predetermined time period. At operation 623, the UE sets the predetermined time period based on the configuration input.

At operation 626, the UE receives a first input through an input device. The first input instructs the UE to perform a function (e.g., operation 430 in FIG. 4). At operation 629, the UE discards the first input and continues displaying the at least one image based on a predetermined rule (e.g., operation 434 in FIG. 4). Optionally, the UE discards the first input from a second time point that is a predetermined time period subsequent to the first time point (e.g., operation 566 in FIG. 5). The predetermined rule may define discarding the first input when the first application is on a first list of applications (e.g., operation 306 in FIG. 3). To detect that the at least one image is being rendered by the first application in the predetermined display mode, the UE may detect that a video is being rendered at the screen display. The predetermined rule may define discarding the first input when the video is streamed to the UE. At operation 633, the UE may determine a third time point at which the rendering of the at least one image is stopped (e.g., operation 448 in FIG. 4). At operation 636, the UE may stop discarding the first input after the third time point (e.g., operation 450 in FIG. 4).

Figure 7:
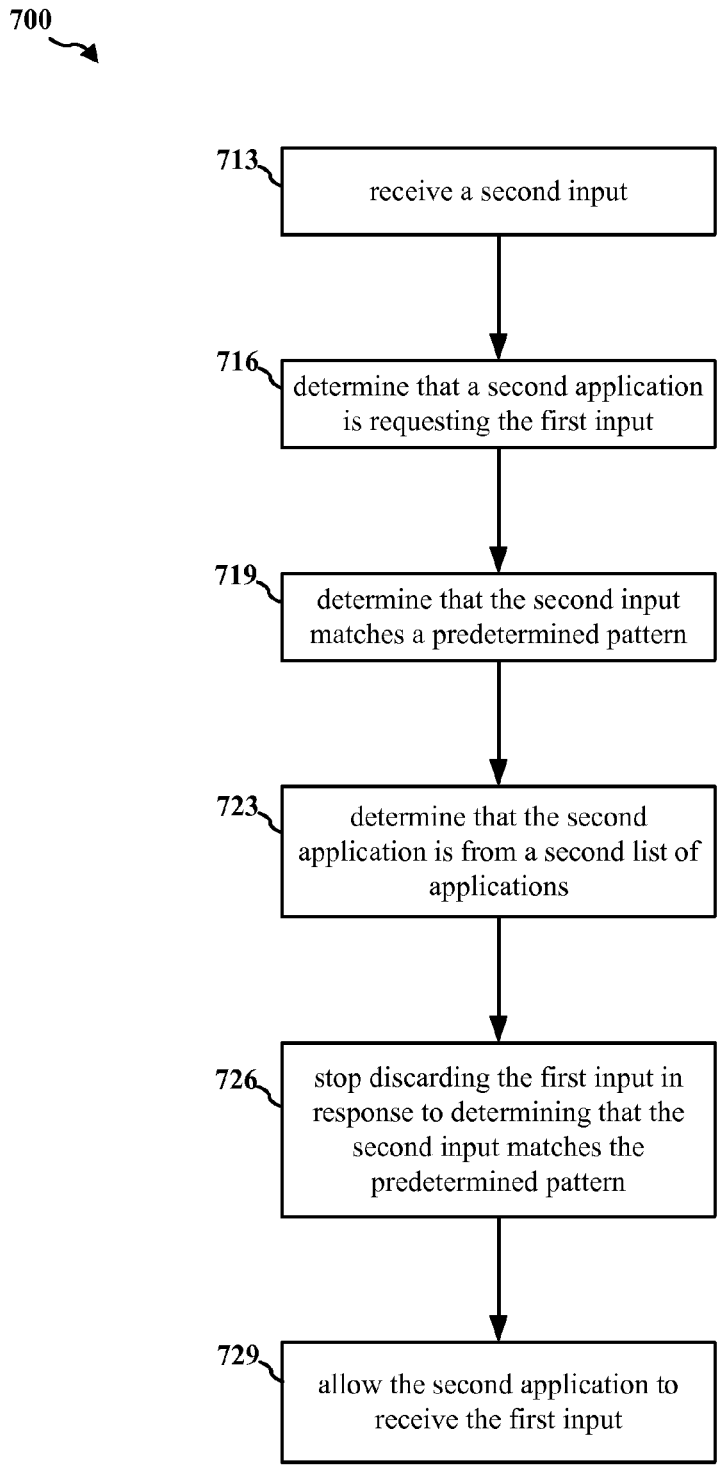
FIG. 7 is a flow chat illustrating another procedure of operating a UE in a locked-screen mode.

FIG. 7 is a flow chat 700 illustrating another procedure of operating a UE in a locked-screen mode. This procedure is performed after operation 626 illustrated in FIG. 6. At operation 713, the UE may receive a second input (e.g., operation 430 in FIG. 4). At operation 716, the UE may determine that the second input matches a predetermined pattern (e.g., operation 432 in FIG. 4). At operation 719, the UE may stop discarding the first input in response to determining that the second input matches the predetermined pattern (e.g., operation 436 in FIG. 4). At operation 723, the UE may determine that a second application is requesting the first input (e.g., operation 437 in FIG. 4). At operation 726, the UE may determine that the second application is on a second list of applications (e.g., operation 438 in FIG. 4). At operation 726, the UE may stop discarding the first input in response to determining that the second application is requesting the first input (e.g., operation 442 in FIG. 4). At operation 729, the UE may allow the second application to receive the first input (e.g., operation 444 in FIG. 4).

In certain configurations, the UE utilizes the screen lock control module 163 to perform the procedures illustrated in FIGS. 6-7. The screen lock control module 163 may reside in the memory 116. The processor 113 may read processing instructions and code of the screen lock control module 163 from the memory 116. Accordingly, the processor 113 may be configured to perform the procedures illustrated in FIGS. 6-7.

In one configuration, an apparatus is provided with a screen display. The apparatus may be a UE. The apparatus includes means for detecting that at least one image is being rendered by a first application in a predetermined display mode at the screen display. The apparatus includes means for receiving a first input through an input device. The first input instructs the UE to perform a function. The apparatus includes means for discarding the first input and continuing displaying the at least one image based on a predetermined rule.

The predetermined rule may define discarding the first input when the first application is on a first list of applications. The means for detecting that the at least one image is being rendered by the first application in the predetermined display mode may be configured to detect that a video is being rendered at the screen display. The predetermined rule may define discarding the first input when the video is streamed to the UE.

The apparatus may include means for determining a first time point at which the rendering of the at least one image is started. The means for discarding the first input may be configured to discard the first input from a second time point that is a predetermined time period subsequent to the first time point. The apparatus may include means for receiving a configuration input that indicates the predetermined time period. The apparatus may include means for setting the predetermined time period based on the configuration input. The apparatus may include means for determining a third time point at which the rendering of the at least one image is stopped. The apparatus may include means for stopping discarding the first input after the third time point.

The apparatus may include means for receiving a second input. The apparatus may include means for determining that the second input matches a predetermined pattern. The apparatus may include means for stopping discarding the first input in response to determining that the second input matches the predetermined pattern. The apparatus may include means for determining that a second application is requesting the first input. The apparatus may include means for determining that the second application is on a second list of applications. The apparatus may include means for stopping discarding the first input in response to determining that the second application is requesting the first input. The apparatus may include means for allowing the second application to receive the first input.

The aforementioned means may be, among other components, the screen lock control module 163, the processor 113, the memory 116, the network controller 123, the input device 126, the display device 129, the storage 133, and/or the OS 153.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a user equipment (UE) having a screen display, comprising:
   detecting that at least one image is being rendered by a first application in a predetermined display mode at the screen display;
   receiving a first input through an input device, wherein the first input instructs the UE to perform a function;
   discarding the first input and continuing displaying the at least one image based on a predetermined rule;
   determining that a second application is requesting the first input;
   determining that the second application is on a second list of applications;
   stopping the discarding the first input in response to determining that the second application is requesting the first input; and
   allowing the second application to receive the first input.

2. The method of claim 1, wherein the predetermined rule defines discarding the first input when the first application is on a first list of applications.

3. The method of claim 1, wherein the detecting that the at least one image is being rendered by the first application in the predetermined display mode includes detecting that a video is being rendered at the screen display.

4. The method of claim 3, wherein the predetermined rule defines discarding the first input when the video is streamed to the UE.

5. The method of claim 1, comprising determining a first time point at which the rendering of the at least one image is started, wherein the discarding the first input is executed from a second time point that is a predetermined time period subsequent to the first time point.

6. The method of claim 5, comprising:
   receiving a configuration input that indicates the predetermined time period; and
   setting the predetermined time period based on the configuration input.

7. The method of claim 1, comprising:
   determining a third time point at which the rendering of the at least one image is stopped; and
   stopping discarding the first input after the third time point.

8. The method of claim 1, comprising:
   receiving a second input;
   determining that the second input matches a predetermined pattern; and
   stopping discarding the first input in response to determining that the second input matches the predetermined pattern.

9. An apparatus, the apparatus being a user equipment (UE) having a screen display, comprising:
   a memory; and
   at least one processor coupled to the memory and configured to:
      detect that at least one image is being rendered in a predetermined display mode at the screen display;
      receive a first input through an input device, wherein the first input instructs the UE to perform a function;
      discard the first input and continue displaying the at least one image based on a predetermined rule;
      determine that a second application is requesting the first input;
      determine that the second application is on a second list of applications;
      stop the discarding the first input in response to the determination that the second application is requesting the first input; and
      allow the second application to receive the first input.

10. The apparatus of claim 9, wherein the predetermined rule defines discarding the first input when the first application is on a first list of applications.

11. The apparatus of claim 9, wherein to detect that the at least one image is being rendered by the first application in the predetermined display mode, the at least one processor is further configured to detect that a video is being rendered at the screen display.

12. The apparatus of claim 11, wherein the predetermined rule defines discarding the first input when the video is streamed to the UE.

13. The apparatus of claim 9, wherein the at least one processor is further configured to determine a first time point at which the rendering of the at least one image is started, wherein the at least one processor is configured to discard the first input from a second time point that is a predetermined time period subsequent to the first time point.

14. The apparatus of claim 13, wherein the at least one processor is further configured to:
  receive a configuration input that indicates the predetermined time period; and
  set the predetermined time period based on the configuration input.

15. The apparatus of claim 9, wherein the at least one processor is further configured to:
  determine a third time point at which the rendering of the at least one image is stopped; and
  stop discarding the first input after the third time point.

16. The apparatus of claim 9, wherein the at least one processor is further configured to:
  receive a second input;
  determine that the second input matches a predetermined pattern; and
  stop discarding the first input in response to determining that the second input matches the predetermined pattern.

17. An apparatus having a screen display, the apparatus being a user equipment (UE), comprising:
  means for detecting that at least one image is being rendered by a first application in a predetermined display mode at the screen display;
  means for receiving a first input through an input device, wherein the first input instructs the UE to perform a function;
  means for discarding the first input and continuing displaying the at least one image based on a predetermined rule;
  means for determining that a second application is requesting the first input;
  means for determining that the second application is on a second list of applications;
  means for stopping the discarding the first input in response to determining that the second application is requesting the first input; and
  means for allowing the second application to receive the first input.

18. The apparatus of claim 17, wherein the predetermined rule defines discarding the first input when the first application is on a first list of applications.

* * * * *